W. H. WYVILL & J. A. TALBOTT.
PIPE LINE COUPLING FOR RAILWAY CARS.
APPLICATION FILED MAY 13, 1913.
1,093,676. Patented Apr. 21, 1914.
2 SHEETS—SHEET 1.
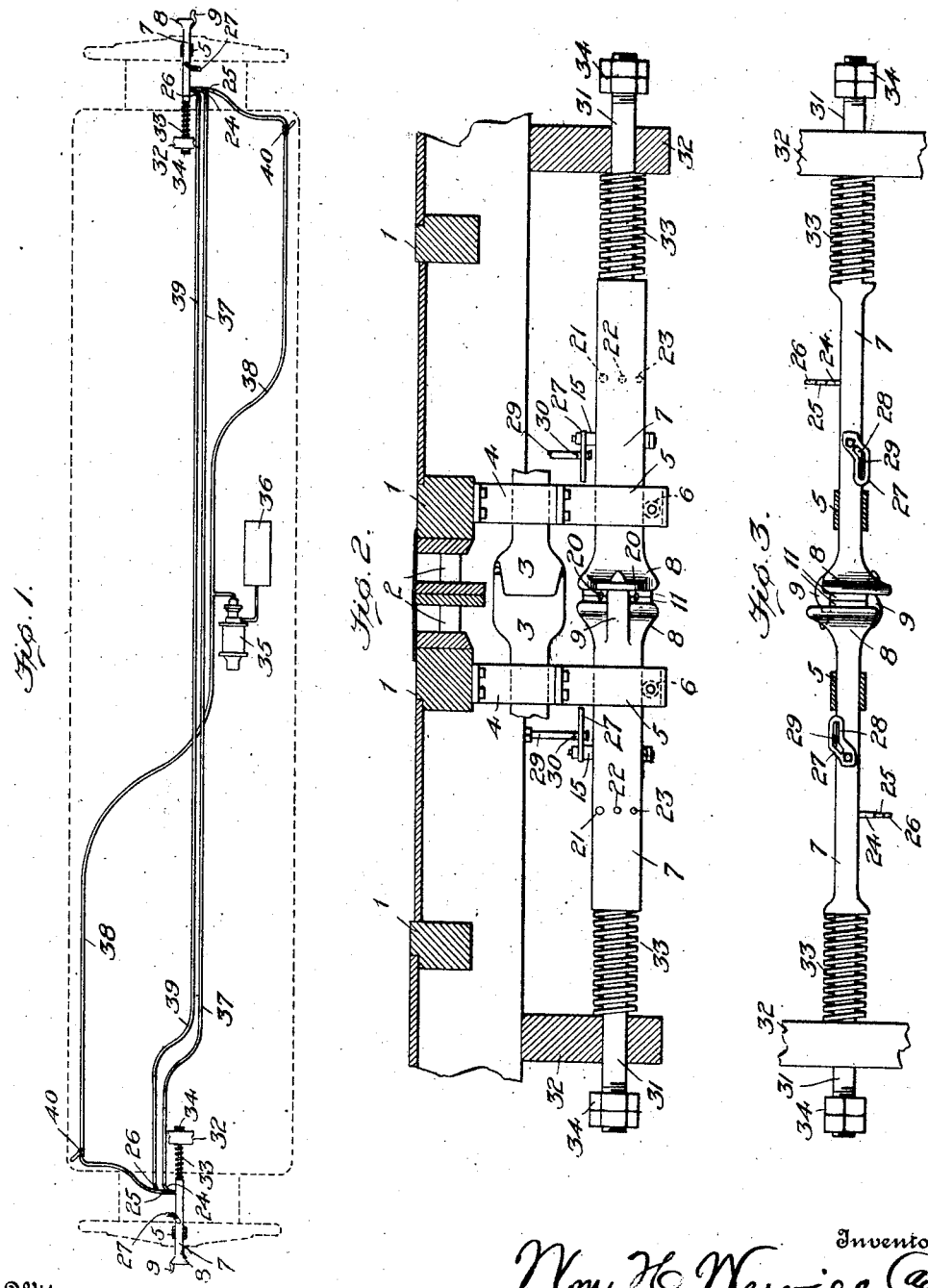

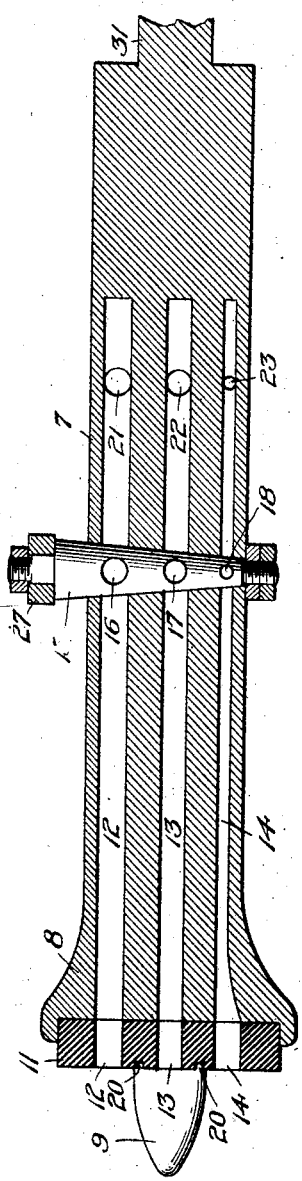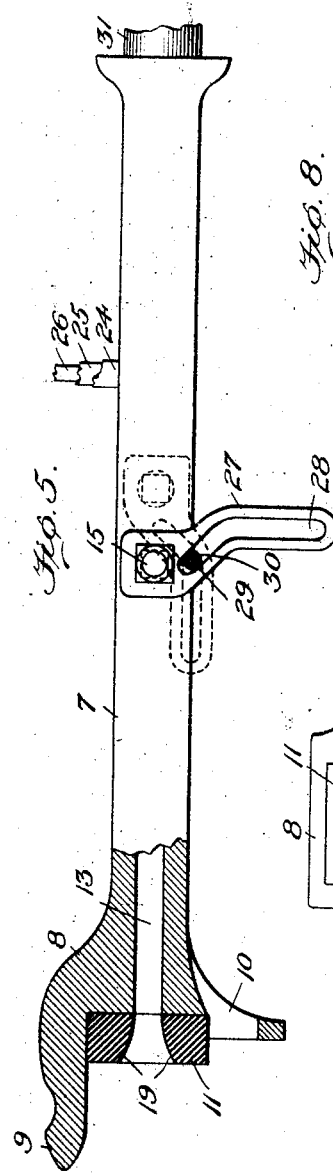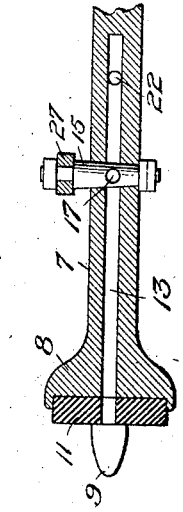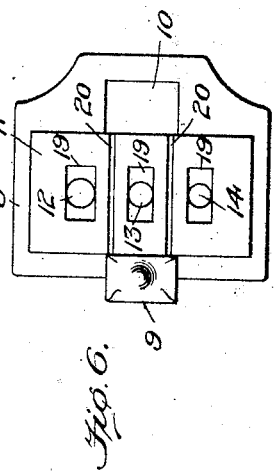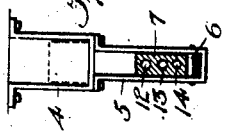

UNITED STATES PATENT OFFICE.

WILLIAM H. WYVILL AND JOHN A. TALBOTT, OF UPPER MARLBORO, MARYLAND.

PIPE-LINE COUPLING FOR RAILWAY-CARS.

1,093,676.

Specification of Letters Patent.

Patented Apr. 21, 1914.

Application filed May 13, 1913. Serial No. 767,285.

*To all whom it may concern:*

Be it known that we, WILLIAM H. WYVILL and JOHN A. TALBOTT, citizens of the United States, residing at Upper Marlboro, in the county of Prince Georges and State of Maryland, have invented certain new and useful Improvements in Pipe-Line Couplings for Railway-Cars; and we do hereby declare the following to be a full, clear, and exact description of the invention such as will enable others skilled in the art to which it appertains to make and use the same.

Our invention relates to pipe line couplings for railway cars, but has reference, more particularly stated, to improved mechanism for automatically and instantaneously connecting and disconnecting adjacent ends of the steam heat, air brake, and signal lines of railway cars during the car coupling and car uncoupling operations.

It has for a further object accomplishment of the above stated results by mechanism which is peculiarly simple and durable in construction, easily maintained in service, and not likely to become deranged.

With the foregoing and other objects in view the invention will be hereinafter particularly described and pointed out in the claims following.

In the accompanying drawings which form part of this application for Letters Patent, and whereon corresponding reference characters indicate like parts in th several views: Figure 1 is a top plan view of our improved pipe line couplings and intervening piping constituting the equipment for a single car which latter is indicated by dotted lines. Fig. 2 represents fragmentary portions of two cars in coupled relation, with our invention in side elevation also coupled. Fig. 3 is a top plan view of our improvements in coupled relation. Fig. 4 is a longitudinal vertical section upon a relatively enlarged scale, taken through the center of our improved pipe coupling head and stem. Fig. 5 is a plan view of parts shown by Fig. 4, with the coupler head partly in section. Fig. 6 is an end view looking directly into the coupler head. Fig. 7 is a detailed side elevation of coupler stem support, and, Fig. 8 is a vertical longitudinal sectional view of the invention slightly modified to meet the requirement of freight cars.

Reference being had to the drawings and numerals thereon, 1 indicates transverse and longitudinal sills of an ordinary car frame, 2 car bumpers, and 3 car couplers all of ordinary and well known construction. Bolted to the transverse end sills 1 are depending brackets 4 within which the car coupler stems reciprocate in the usual and well understood manner, and from these in turn depend similar brackets 5 provided at their lower extremities with transverse rollers 6 upon which latter rest the stems 7 of our improved pipe couplings as best shown by Figs. 2 and 7 of the drawings.

In view of the fact that we make no claim whatever to the form of car couplings 3 diagrammatically shown in Fig. 2, the reference hereinafter made to couplings will be understood to mean our improved pipe-line couplings; and since all coacting or interconnecting couplings shown are exact duplicates a detailed description of one only will be sufficient.

The coupler stem 7 aforesaid is, by preference, of rectangular form in cross section and provided with a somewhat enlarged head 8, from one side of which latter projects a pilot finger 9 of substantially wedge shape and without angles, while the opposite side of said enlarged head 8 is perforated as at 10 to receive, at times, the corresponding pilot finger of a coacting coupler head. Seated in the mouth of said coupler head is a suitable air and steam-tight packing 11 of relatively thick rubber, rubber and fabric, or other yielding composition, which, together with the major portion of the coupler stem 7 is perforated by independent and superimposed longitudinal fluid ducts 12, 13, and 14, guarded by a common valve 15 having independent ports 16, 17 and 18 adapted to register with their respective ducts aforesaid. At their entrance, in packing 11, these ducts 12, 13 and 14 are flared laterally as at 19 (Figs. 5 and 6) the better to insure registration at times with corresponding ducts of an adjacent coupler; and between these ducts the packing 11 is crossed horizontally by surface grooves 20, 20 (Figs. 5 and 6) by means of which any fluid which may possibly escape from one or the other of said ducts at the instant of coupling may find vent to the outside atmosphere rather than communicate with an adjacent duct. Near their inner ends said fluid ducts 12, 13 and 14 are provided with outlets 21, 22 and 23 to which are coupled flexible connections 24, 25 and 26, respectively; while the upwardly projecting end or stem of controlling valve 15 is equipped with an angular operating lever 27 having therein a longitudinal slot 28 of corresponding angular form at all times engaged by a bolt 29 fixed with relation to the car frame, and surrounded by a friction roller 30 resting within said slot 28 for purposes which will later appear. Projecting from the end of stem 7 is a tail-bolt 31, preferably integral and of reduced construction, arranged and adapted to reciprocate in a cross timber or other bearing 32 between which and the body of said stem is interposed a relatively stiff reaction spring 33 which constantly exerts itself to project the entire coupler. This tail-bolt is surrounded by said spring 33 and is provided with a nut or nuts 34 to limit advance movement of the entire coupler.

In practising our invention it will be understood that each car is equipped with a coupler, such as hereinbefore described, at both ends as indicated by Fig. 1, said couplers being exact duplicates; and each car, moreover, being equipped with the usual brake cylinder 35, auxiliary air reservoir 36, and steam, air, and signal pipes 37, 38 and 39, these latter communicating directly with the before-mentioned flexible connections 24, 25 and 26 respectively. And in addition it will be noticed by reference to Fig. 1 that air pipe 38 is provided with an auxiliary valve 40 near each end for purposes which will later appear.

The operation of our invention is substantially as follows: Prior to the coupling operation our improved couplers normally project several inches beyond the ordinary car coupler 3, being yieldingly retained in this projected position by action of spring 33; when now two cars are brought together as shown by Fig. 2 the entire couplers are reciprocated longitudinally, the said springs 33 compressed, the two coupler heads brought into exact alinement by coöperation of their pilot fingers 9 and perforations 10, respectively, packings 11, 11, are forced into close contact, and valve 15 opened automatically. The uncoupled position of this valve 15 is closed, as shown by Fig. 4, under which condition the valve handle 27 stands at right angles to the longitudinal axis of the coupler stem 7 as shown by Fig. 5. At this time the relatively fixed operating rod 29 with its anti-friction roller 30 rests in the angular slot 28 of said handle, and obviously a longitudinal inward movement of the entire coupler, caused by contact with the coupler of an adjacent car, necessarily throws said handle 27 into the position indicated by dotted lines in Fig. 5, that is to say, into the coupled position as shown by Figs. 2 and 3, valve 15 being thus opened automatically when our coupler is in service, and as invariably closed automatically when not in service. And, owing to the angular arrangement of slot 28 the couplers may continue to move longitudinally after a movement sufficient to open valve 15 has been effected, a distance equal to the length of said slot, thereby insuring a close fluid-tight joint between the abutting faces of two packing glands 11 when the coupling is completed. It will be further noted that our couplings are automatically connected as well as automatically controlled; their location being in the longitudinal center of the car frame they practically register when two such couplings are brought together, but allowing for some slight variance even in standard cars, it will be seen that the shape and configuration of the pilot fingers 9 and perforations 10 coöperate to insure complete registration of interconnecting couplers. And, moreover, the laterally flaring entrance or mouth 19 of each duct 12, 13 and 14 contributes to their registration with corresponding ducts of an abutting coupler, thus rendering an exactness of registration unnecessary. Curves in a roadbed are provided for by the yielding character of packings 11, and by the further fact that ducts 12, 13 and 14 are arranged in the same vertical plane at the center line of curvature, the bare possibility of leakage from one of said ducts to another being guarded against by interposed transverse grooves or gutters 20, 20, by agency whereof any such leakage or overpressure would find vent to the atmosphere.

By reference to Fig. 1 of the drawings it will be observed that air pipe 38 leads from brake cylinder 35 to our improved couplers by way of diametrically opposite corners of the car frame at which points, within easy reach from the side of the car, are located auxiliary valves 40. Ordinarily these hand valves 40 are open, but it is evident that they may be independently operated, and that when closed they relieve valves 15 of all pressure and safeguard them against leakage during uncoupled periods.

Fig. 8 illustrates our invention as applied to freight cars wherein the central air duct 13, only, is employed with the necessary coacting parts, its use and operation, however, being substantially as hereinbefore described, except that the packing 11 of a freight coupler, when brought into coupling relation with a passenger car coupler, serves to close steam duct 12 and signal duct 14, but registers with the central air brake duct 13 the same as if meeting with another freight car.

The foregoing is a description of our invention in its best form of construction at present known to us, but it should be understood that various changes of form, construction and arrangement of parts may be made and substituted for those herein shown and described without materially departing from the spirit of our invention, and to such we lay claim the same as if specified, for example, coupler tail-bolts 31 may, if desired, be swiveled at or near their extremities, and the opposite end of coupler stems 7 may be supported in brackets 5, or the equivalent, of greater width thereby providing for a lateral movement, as with ordinary car couplers.

Having thus described our invention, what we claim and desire to secure by Letters Patent is:

1. The combination with a supporting frame, of a pipe line coupler for railway cars having independent fluid ducts arranged vertically therein, a controlling valve vertically disposed in said coupler and common to all of said ducts, a lever provided with a slot closed at its ends and secured to said controlling valve and projecting in a horizontal plane to one side thereof, an operating rod projecting from a relatively fixed support and arranged to operate in the slot of said lever, said rod being adapted to open the controlling valve each time the coupler is reciprocated in the act of coupling, and an angular continuation of said slot for permitting further reciprocation of the coupler while the controlling valve stands open.

2. In a train pipe coupling a pair of coupling members each of which comprises a stem having ducts arranged independently therein, a head provided on said stem, a controlling valve positioned in said stem having openings therein adapted to register with said ducts, supporting frames at the outer ends of said stems having rollers mounted therein, means whereby said frames are suspended to hold said stems upon the rollers, interlocking means formed on said stems adapted to engage openings formed in the head of said stem whereby the coupling members are fastened together, packing glands located in the end of each head and having openings registering with the ducts in the coupling members, and means including a lever provided with a slot closed at its ends and secured to said controlling valve and a relatively fixed operating rod engaging said slot for turning said valve and regulating the flow of fluid through said ducts when the coupling members are brought together.

3. In a train pipe coupling a pair of coupling members each of which comprises a stem having ducts arranged independently therein, a head provided on said stem, a controlling valve positioned in said stem having openings therein adapted to register with said ducts, supporting frames at the outer ends of said stems having rollers mounted therein, means whereby said frames are suspended to hold said stems upon the rollers, interlocking means formed on said stems adapted to engage openings formed in the head of said stem whereby the coupling members are fastened together, packing glands located in the end of each head and having flared openings therein registering with the ducts in each coupling member, a plurality of grooves provided in said packing glands between said openings, and means including a lever provided with a slot closed at its ends and secured to said controlling valve and a relatively fixed operating rod engaging said slot for turning said valve and regulating the flow of fluid through said ducts when the coupling members are brought together.

In testimony whereof we affix our signatures, in presence of two subscribing witnesses.

WILLIAM H. WYVILL.
JOHN A. TALBOTT.

Witnesses as to signature of W. H. W.
   LAVINIA M. B. SMITH,
   R. ERNEST V. SMITH.

Witnesses as to signature of J. A. T.:
   JAMES H. OWEN,
   GREY OWEN.